(12) United States Patent
Bansode et al.

(10) Patent No.: US 8,306,946 B2
(45) Date of Patent: Nov. 6, 2012

(54) DEPLOYMENT MANAGER FOR MASTER DATA MANAGEMENT

(75) Inventors: Neelesh V. Bansode, Bangalore (IN); Santosh K. Singh, Bangalore (IN); Carl L. Christofferson, Escondido, CA (US); Thomas K. Ryan, Valley Center, CA (US); Brian J. Wasserman, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 329 days.

(21) Appl. No.: 12/557,270

(22) Filed: Sep. 10, 2009

(65) Prior Publication Data

US 2010/0088286 A1   Apr. 8, 2010

Related U.S. Application Data

(60) Provisional application No. 61/195,322, filed on Oct. 6, 2008.

(51) Int. Cl.
*G06F 17/30* (2006.01)
(52) U.S. Cl. .................................. 707/609; 717/174
(58) Field of Classification Search .......... 717/168–178, 717/121; 707/609, 999.2
See application file for complete search history.

(56) References Cited

U.S. PATENT DOCUMENTS

| | | | |
|---|---|---|---|
| 5,367,686 A * | 11/1994 | Fisher et al. | 717/174 |
| 8,069,435 B1 * | 11/2011 | Lai | 717/106 |
| 2002/0049749 A1 * | 4/2002 | Helgeson et al. | 707/3 |
| 2002/0188486 A1 * | 12/2002 | Gil et al. | 705/7 |
| 2005/0049790 A1 * | 3/2005 | Holman et al. | 702/3 |
| 2006/0036651 A1 * | 2/2006 | Cope et al. | 707/200 |
| 2006/0136897 A1 * | 6/2006 | Laxminarayan et al. | 717/168 |
| 2007/0157096 A1 * | 7/2007 | Keren et al. | 715/760 |

* cited by examiner

*Primary Examiner* — Thu-Nguyet Le
(74) *Attorney, Agent, or Firm* — Gates & Cooper LLP

(57) ABSTRACT

A method, apparatus, and article of manufacture provide the ability to deploy a data management application to a target computer system. Metadata for a master data management (MDM) application is stored in a deployment database. The metadata is representative of business rules and process workflows that manage business data from multiple sources and a model definition for a model for a central business database. Configuration settings for the MDM application are stored in the deployment database. The metadata and configuration settings are retrieved from the deployment database. Installation instructions of the MDM application are confirmed based on input into a graphical user interface. The master data management application is installed on the target computer system based on the installation instructions, metadata, and configuration settings.

18 Claims, 2 Drawing Sheets

DEPLOYMENT MANAGER FOR MASTER DATA MANAGEMENT

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/195,322, filed Oct. 6, 2008, by Neelesh Bansode, Santosh K. Singh, Carl Christofferson, Thomas K. Ryan, and Brian J. Wasserman, entitled "Deployment Manager for Master Data Management".

BACKGROUND OF THE INVENTION

1. Field of the Invention

This invention relates in general to managing business critical data in a computer, and in particular, to deploying files for a data model to a test or production system.

2. Description of Related Art

Master Data Management™, available from the assignee of the present invention, is an application that allows users to manage their business critical data. This critical data can originate from a myriad of sources and external feeds, but ultimately, the goal is that all of this data be consolidated into a central business data warehouse. Master Data Management™ is the process and framework for maintaining a series of business rules and process workflows that will manage this data as it feeds in from multiple sources. Master Data Management™ then applies these business rules and process workflows to produce "master" data, which is then fed to all consuming business processes.

Core to the management of master data is the definition of a data model. The data model serves as the foundation for all business rules and workflow processes within the Master Data Management™ (MDM) framework. The data model represents the form the master data must ultimately take in the customer's data warehouse to be used by the consuming business applications.

In one or more embodiments of the invention, the business rules, process workflows, and model definition are stored as metadata in a plethora of text based Extensible Markup Language (XML) files, which are themselves stored in a specific file and folder hierarchy. Often times, the business rules, workflows, and the model definition—as well as a variety of MDM server and service files—are all developed locally on a single user's system during the development process. At some point, these files must be deployed to a test (or 'QA'— Quality Assurance) and/or production system, on which the MDM server and services will run. Embodiments of the invention then manage the deployment of these various files from the development system, to any designated target system—such as a test or QA system, or to a production system.

In a similar manner, there are various runtime artifacts that must also be deployed. These include MDM Server and Service configuration settings, web archives (WAR files), and a series of batch files. Anytime the MDM Framework is deployed onto a system—and into a webserver such as WebLogic™ (available from Oracle™ Corporation) or WebSphere™ (available from IBM™ Corporation)—these files must be configured to match the production server, the production database, and the correct webserver configuration.

In the prior art, the deployment of these metadata files occurs manually, requires hand-editing multiple configuration and batch files, and is unsecured—meaning any user can make modifications on the target system. This leaves lots of room for human error, or the potential for someone to deliberately modify the deployed files (possibly with malicious intent).

Accordingly, what is needed is the capability to deploy metadata files on a designated target system in an automated matter while ensuring the files remain secure and have not been locally modified.

SUMMARY OF THE INVENTION

Embodiments of the present invention provide significant technological innovations and may accomplish two primary goals. First, embodiments may provide for security and verification of a deployed MDM Solution by leveraging systems and functionality provided by Teradata® relational database management systems (RDBMS) (available from the assignee of the present invention) in the deployment process. Second, embodiments may provide an optimization to the process of deploying a MDM Solution, as the need for users to manually hand-edit multiple configuration and batch files may be removed. Embodiments may also remove the complexity involved in deploying the solution to target systems with different configurations or webservers, as such tasks may mask this complexity from end users. Such optimization may ultimately reduce the deployment time from hours to minutes.

Accordingly, embodiments of the invention manage the deployment of an MDM solution and all of its metadata and configuration files to a designated target system. Such a deployment solution may be referred to herein as a deployment manager. The following goals may be met by a deployment manager:

Manage and secure the deployment of all metadata and runtime files by deploying a MDM Solution through a Teradata™ database. The deployment manager can leverage security features available from a Teradata™ based system to prevent unauthorized access to deployment or metadata files;

Provide a checksum capability—this will allow for verification that a deployed system was deployed only through Teradata™, and that its contents match that of a deployed release that is currently stored in Teradata™;

Properly deploy all metadata files into their correct file and folder hierarchy on the target system;

Properly deploy all runtime artifacts—such as WAR files—to the target system, and for all supported webservers; and Automatically update all batch files and server/service configuration files for the target environment.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Embodiments of the invention manage the deployment of various files from a development system to any designated target system (e.g., a test or QA system or to a production system). Such files may be automatically configured, making the process of deploying a system more efficient and easier.

To provide such functionality, a deployment manager is integrated into a master data management (MDM) framework. Embodiments of the invention both simplify and optimize the process of deploying a MDM Solution, as it will automatically deploy the various XML files into their proper file and folder hierarchy, and it will deploy and configure any other runtime artifacts—such as the WAR file, service/server configuration files, and batch files—to any system regardless of the target environment or webserver. Embodiments may also provides a level of security, such that the current deployment of MDM can be validated against the last "official" deployed version—ensuring that end users cannot hand edit files and change the internal MDM business rules, workflows, or model representations.

Hardware and Software Environment

Master data (sometimes referred to as reference data) are facts that define a business entity, facts that may be used to model one or more definitions or view of an entity. Entity definitions based on master data provide business consistency and data integrity when multiple systems across an organization (or beyond) identify the same entity differently (e.g., in differing data models).

Business entities modeled via master data are usually customer, product, or finance. However, master data can define any entity, like employee, supplier, location, asset, claim, policy, patient, citizen, chart of accounts, etc.

A system of record is often created or selected (also referred to as a trusted source) as a central, authenticated master copy from which entity definitions (and physical data) are propagated among all systems integrated via a Master Data Management™ (MDM) framework 100.

The system of record can take many forms. Many users build a central database (e.g. a data warehouse or operational data store) as a hub through which master data, metadata, and physical data are synchronized. Some hubs are simply master files or tables that collect and collate records.

Regardless of the technology approach, embodiments of the invention provide the ability to deploy a system on any designated target system for testing or production.

Figure 1:
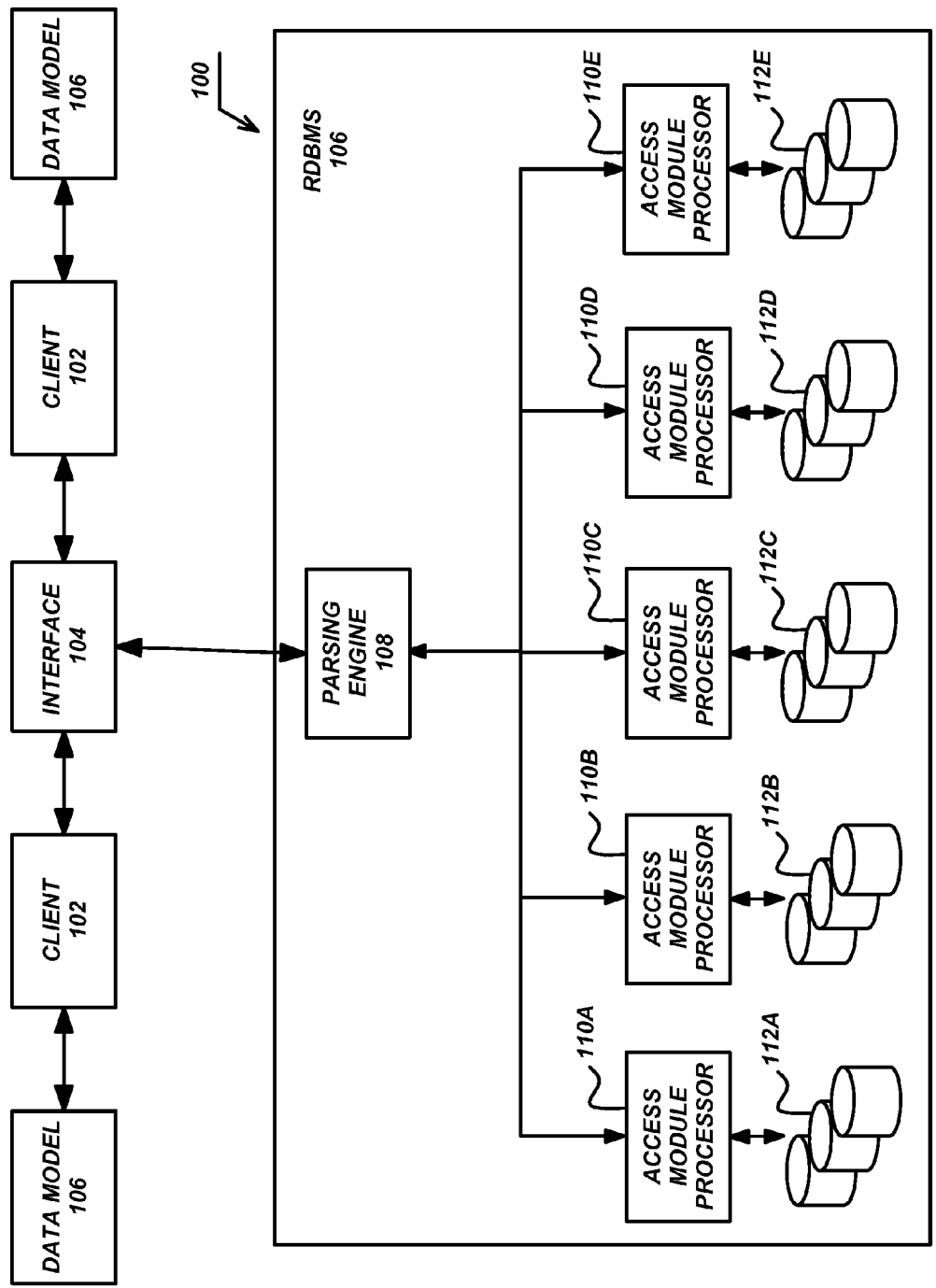
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements an improved MDM framework 100, in a three-tier client-server architecture, wherein the first or client tier provides clients 102 that may include, inter alia, a graphical user interface (GUI), the second or middle tier provides an interface 104 for performing functions and interfacing with a central database or data warehouse as described later in this application, and the third or server tier comprises the central database or data warehouse (also referred to as a Relational DataBase Management System (RDBMS) 106) that stores data and metadata in a relational database. Such an RDBMS 106 is utilized to store the master data and provide a standard format within framework 100 for the master data. The first, second, and third tiers may be implemented in separate machines, or may be implemented as separate or related processes in a single machine.

In the preferred embodiment, the RDBMS 106 includes at least one parsing engine (PE) 108 and one or more access module processors (AMPs) 110A-110E storing the relational database in one or more data storage devices 112A-112E. The parsing engine 108 and access module processors 110 may be implemented in separate machines, or may be implemented as separate or related processes in a single machine. The RDBMS 106 used in the preferred embodiment comprises the Teradata® RDBMS sold by Teradata™ US, Inc., the assignee of the present invention, although other DBMS's could be used. In this regard, Teradata® RDBMS is a hardware and software based data warehousing and analytic application/database system.

Generally, clients 102 include a graphical user interface (GUI) for operators or users of the system 100, wherein requests are transmitted to the interface 104 to access data stored in the RDBMS 106, and responses are received therefrom. In response to the requests, the interface 104 performs the functions described below, including formulating queries for the RDBMS 106 and processing data retrieved from the RDBMS 106. Moreover, the results from the functions performed by the interface 104 may be provided directly to clients 102 or may be provided to the RDBMS 106 for storing into the relational database. Once stored in the relational database, the results from the functions performed by the interface 104 may be retrieved more expeditiously from the RDBMS 106 via the interface 104. Further, each client 102 may have other data models 106.

Note that clients 102, interface 104, and RDBMS 106 may be implemented in separate machines, or may be implemented as separate or related processes in a single machine. Moreover, in one or more embodiments, the system 100 may use any number of different parallelism mechanisms to take advantage of the parallelism offered by the multiple tier architecture, the client-server structure of the client 102, interface 104, and RDBMS 106, and the multiple access module processors 110 of the RDBMS 106. Further, data within the relational database may be partitioned across multiple data storage devices 112 to provide additional parallelism.

Generally, the clients 102, interface 104, RDBMS 106, parsing engine 108, and/or access module processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices. The above elements 102-112 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

As described above, the business rules, process workflows, and model definitions may be stored as metadata in XML files that are stored in a specific file and folder hierarchy by RDBMS 106. Such files often need to be deployed to a designated target system such as on a client 102. Such metadata files are automatically configured while the files and configuration settings are deployed through the RDBMS 106 (e.g., a Teradata® database). The use of the RDBMS 106 provides the ability to leverage many RDBMS 106 features including the ability to store a representation of the framework and metadata, as well as to restrict access to the representation to prevent modification of the metadata by unauthorized users.

To prevent access, there is a security aspect to systems managing the deployment of the information (hereinafter referred to as the deployment manager). In order to properly support and maintain a master data management (MDM) system on a client, there must be a way of validating that the MDM configuration settings, business rules, workflow processes, and model specification have not been directly modified locally on the production system. The majority of this information is stored in text based XML files (e.g., by RDBMS 106), and can easily be edited by any user of the system (e.g., via interface 104). However, embodiments of the invention may provide that changes to the system be made through a design tool (e.g., Studio™ design tool available from the assignee of the present invention), with the changes deployed through the deployment manager, via the database system 106. Accordingly, the deployment manager may include a "CheckSum" feature that validates that only the runtime production system has been properly deployed, and prevents any direct editing of the MDM metadata files on the production (or client) system.

The deployment manager may provide many capabilities, features, and advantages over prior art systems. Such capabilities include:
  A. Providing an automatic way to move developed services and WAR files to another server, keeping existing directory structure;
  B. Providing an automatic way to modify metadata, startup and batch files to reflect the new server and database environment;
  C. Automatically adjusting for the target operating system (Windows™, AIX™, Linux™);
  D. For each application developed independently, bundling and deploying in a separate package;
  E. Deploying multiple applications (such as CDI [customer data integration] and PIM [product information management]) on the same server and system;
  F. Deploying an entire package (either with or without support for incremental updates);
  G. An administrative user deploys for production and a developer user moves from development;
  H. The ability to use as many Teradata® RDBMS features as possible with a deployment manager (i.e. store the package in a Teradata® RDBMS table, keep versions in the table, checksum as an encrypted SP [stored procedure]);
  I. Keeping deployment information in the database and provide reports pertaining to deployment; and
  J. The ability to use standard installation applications to create a deployment manager.

The deployment manager provides the ability to create a runtime deployment package from a MDM application project and move/deploy this code from "development" to "QA" to "production" environments. In the prior art, such functions were carried out by hand. For example, in the prior art, developers were required to copy all of the XML files, preserve their directory structure and then make the appropriate modifications to the metadata and startup files in the new environment. Embodiments of the invention provide an automated (e.g., without the requirement to perform manually copying of the relevant files) way to perform such tasks.

Figure 2:
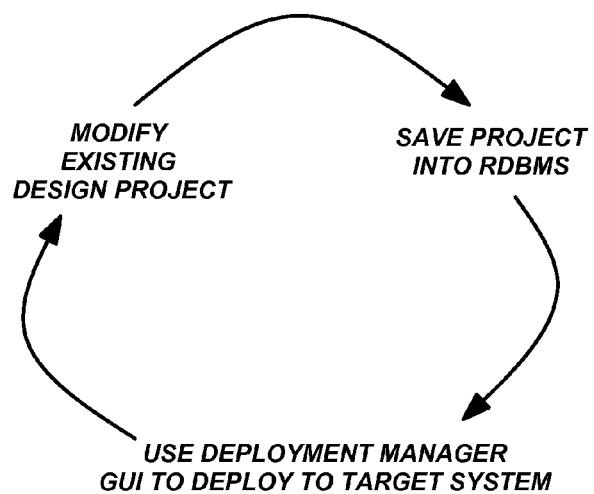
FIG. 2 illustrates the architecture of a deployment manager in accordance with one or more embodiments of the invention.

FIG. 2 illustrates the architecture of a deployment manager in accordance with one or more embodiments of the invention. The deployment manager consists of two parts:
  1) A function within a design application (e.g., the Studio™ design application) to package (zip up) the directories and files created in the design application for an MDM application and then insert the CLOB [character large object] (zip file) into a deployment database and table(s); and
  2) An executable (e.g., an application used to create installers or software packages) for retrieving the application package from the database and deploying it to an existing MDM installation on another system.

The architecture of this feature further includes the deployment of the MDM solution—and all its constituent metadata files—via the Teradata® database.

Accordingly, as illustrated in FIG. 2, an existing design project is modified, saved into a Teradata® RDBMS and a deployment manager graphical user interface can then be used to deploy the design project to a target system.

Logical Flow

Figure 3:
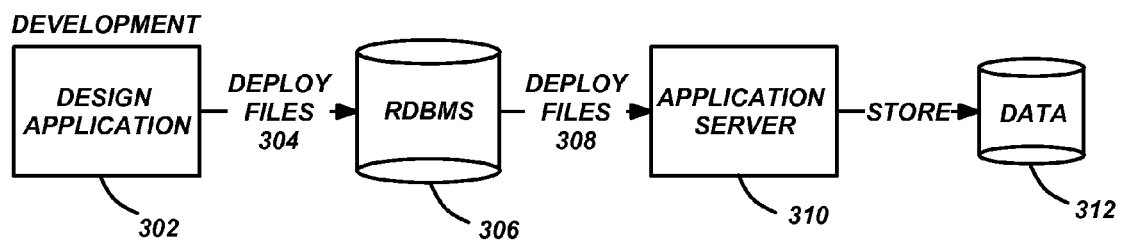
FIG. 3 is a schematic illustrating the logical flow for the deployment of an MDM solution via a Teradata® RDBMS in accordance with one or more embodiments of the invention.

FIG. 3 is a schematic illustrating the logical flow for the deployment of an MDM solution via a Teradata® RDBMS in accordance with one or more embodiments of the invention. During the development stage 302, the design application produces design information that is represented primarily by metadata that is stored in text based XML files and organized into a specific file and folder hierarchy on the development system 302. Such files are rolled up and stored (i.e., deployed) 304 into a Teradata® RDBMS 306. Accordingly, metadata for a master data management application is stored in the deployment database 306. As described above, the metadata is representative of business rules and process workflows that manage business data from multiple sources as well as a model definition for a model for a central business database. The deployment database 306 may also include configuration settings for the master data management application and runtime artifacts. Such runtime artifacts may include web archive files, server configuration file(s), and batch file(s).

Deployment to a target system then occurs through the Teradata® RDBMS 306 as the runtime metadata files (and runtime artifacts) are retrieved from the database 306, verified, and then deployed 308 to the target system (e.g., application server 310) where the information may be stored in a local database 312. Such deployment may be performed using a graphical user interface that allows the user to specify/confirm database names, usernames, and passwords, which result in the use and/or creation of records in tables (including checksums to verify data integrity). Accordingly, a deployer (e.g., an application used to create installers or software packages such as the InstallAnywhere™ executable) or may access the Teradata® RDBMS 306 to read the deployment data and to install such data onto the application server 310. To deploy the data, the GUI may prompt a user to input security information (e.g., username and password), a base location of the MDM server on the application server 310, and the Teradata® RDBMS 306 name. A list of projects may then be retrieved from the Teradata® RDBMS 306 for selection by the user followed by the installation per the user's input.

Using the GUI, the user may be prompted for file and installation locations, database names and locations, security information, project information and selection (including version and modification dates), icon/shortcut creation, port number information, application server 310 information, configuration information (e.g., configuration file names and locations), and metadata/batch file modification. Accordingly, the GUI is used to identify and configure file names, file locations, and (to resolve) configuration issues. Once the input is received from the user via the GUI, the deployment manager retrieves the data from the deployment database 306 (e.g., the specified project files from the appropriate table), creates the appropriate folder structure on the application server's database 312, and deploys any necessary data to the appropriate locations. The manager may also create and/or update a table in the deployment database 306 with the relevant deployment/installation information.

As described above, a checksum may be stored in the deployment database 306 and may be based on the metadata and configuration settings stored in the database 306. Such a checksum is then used on the target system 310 (e.g., by a deployment manager or installation application) to validate the proper deployment of the master data management application. In other words, the checksum confirms that data/files have not been directly modified locally on the target system 310 but are controlled and modified only via a deployment manager. Such a deployment manager will also confirm that the XML files are automatically (e.g., without additional user input) deployed into their proper file and folder hierarchy while also deploying and configuring the runtime artifacts.

As described above, a deployment database 306 may be used and is a separate database to any server databases 312 created. There can be many deployment databases 306, but many implementations may only have a single deployment database 306 created by the design application 302 or as an option from a server database 312 installer. The deployment database 306 contains two tables: (1) project, and (2) deployed. The project table identifies different projects by name, path, user, version, etc. The deployed table identifies users, target systems, and project ids (that link to the project table via foreign key). The use and configuration of these files may be directed by the user (e.g., via the graphical user interface) and provides the ability to easily deploy a MDM application onto a target system without manually copying and configuring files.

Conclusion

This concludes the description of the preferred embodiment of the invention. The following paragraphs describe some alternative embodiments for accomplishing the same invention. In summary, a deployment manager feature streamlines and optimizes the process of deploying an MDM solution from a development system into a quality assurance or production environment. One of many advantages of embodiments of the invention are the invention's flexibility, configurability, and ability to be customized directly to the customers environment. However, this level of flexibility may require the storage of large amounts of information in a metadata format (e.g., XML based files). Embodiments of the invention then reduces the time it takes to deploy a system from several hours down to several minutes, as it will deploy all of the files correctly, as well as modify the appropriate batch and configuration files with the proper system settings. Additionally, embodiments of the invention secures the system in such a way that the files running on a MDM instance cannot be tampered with.

In one alternative embodiment, any type of computer or configuration of computers could be used to implement the present invention. In addition, any database management system, decision support system, on-line analytic processing system, or other computer program that performs similar functions could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of deploying a data management application to a target computer system, comprising:
    (a) storing, in a deployment database, metadata for a master data management application, wherein the metadata is representative of:
        (i) business rules and process workflows that manage business data from multiple sources, wherein:
            (1) the business rules and process workflows are applied, to the business data from the multiple sources, to consolidate the business data and produce master data
            (2) the master data is stored in a central business database; and
            (3) the master data is fed to one or more consuming business processes;
        (ii) a model definition for a form the master data will take in the central business database;
    (b) storing in the deployment database, configuration settings for deployment of the master data management application on the target computer system;
    (c) retrieving the metadata and configuration settings from the deployment database;
    (d) confirming installation instructions of the master data management application based on input into a graphical user interface;
    (e) confirming that any changes made to the metadata and configuration settings were performed using a design tool by an authorized user and that such changes were not directly performed on the target computer system; and
    (f) installing the master data management application on the target computer system based on the installation instructions, metadata, and configuration settings.

2. The computer-implemented method of claim 1, wherein the business rules, process workflows, and model definition are stored as metadata in text based extensible markup language (XML) files.

3. The computer-implemented method of claim 1, wherein the deployment database is a relational database.

4. The computer-implemented method of claim 1, further comprising:
    storing runtime artifacts in the deployment database;
    retrieving the runtime artifacts from the deployment database; and
    basing the installation of the master data management application on the runtime artifacts;
    wherein the runtime artifacts comprise a web archive file, one or more server configuration files, and one or more batch files.

5. The computer-implemented method of claim 1, further comprising:

storing a checksum in the deployment database, wherein the checksum is based on the metadata and configuration settings stored in the deployment database; and using the checksum on the target computer system to validate proper deployment of the master data management application.

6. The computer-implemented method of claim 1, wherein the graphical user interface is used to identify file names, file locations, and configuration issues.

7. An apparatus for deploying a data management application to a target computer system, comprising:
  (a) a deployment computer system including at least one processor;
  (b) a deployment database configured by the deployment computer system;
  (c) a deployment manager, executed by said at least one processor on the deployment computer system, configured to:
    (i) store, in the deployment database, metadata for a master data management application, wherein the metadata is representative of:
      (1) business rules and process workflows that manage business data from multiple sources, wherein:
        (A) the business rules and process workflows are applied, to the business data from the multiple sources, to consolidate the business data and produce master data
        (B) the master data is stored in a central business database; and
        (C) the master data is fed to one or more consuming business processes;
      (2) a model definition for a form the master data will take in the business database;
    (ii) store in the deployment database, configuration settings for deployment of the master data management application on the target computer system;
  (d) an installation application executing on the target computer system, wherein the installation application is configured to:
    (i) retrieve the metadata and configuration settings from the deployment database;
    (ii) confirm installation instructions of the master data management application based on input into a graphical user interface
    (iii) confirm that any changes made to the metadata and configuration settings were performed using a design tool by an authorized user and that such changes were not directly performed on the target computer system; and
    (iv) install the master data management application on the target computer system based on the installation instructions, metadata, and configuration settings.

8. The apparatus of claim 7, wherein the business rules, process workflows, and model definition are stored as metadata in text based extensible markup language (XML) files.

9. The apparatus of claim 7, wherein the deployment database is a relational database.

10. The apparatus of claim 7, wherein:
  (a) the deployment manager is further configured to store runtime artifacts in the deployment database;
  (b) the installation application is further configured to:
    (i) retrieve the runtime artifacts from the deployment database; and
    (ii) base the installation of the master data management application on the runtime artifacts;

wherein the runtime artifacts comprise a web archive file, one or more server configuration files, and one or more batch files.

11. The apparatus of claim 7, wherein:
  the deployment manager is further configured to store a checksum in the deployment database, wherein the checksum is based on the metadata and configuration settings stored in the deployment database; and
  the installation application is further configured to use the checksum on the target computer system to validate proper deployment of the master data management application.

12. The apparatus of claim 7, wherein the graphical user interface is used to identify file names, file locations, and configuration issues.

13. An article of manufacture comprising a program storage device readable by a computer, tangibly embodying at least one program of instructions executable by the computer to perform method steps of deploying a data management application to a target computer system, the method steps comprising the steps of:
  (a) storing, in a deployment database, metadata for a master data management application, wherein the metadata is representative of:
    (i) business rules and process workflows that manage business data from multiple sources, wherein:
      (1) the business rules and process workflows are applied, to the business data from the multiple sources, to consolidate the business data and produce master data
      (2) the master data is stored in a central business database; and
      (3) the master data is fed to one or more consuming business processes;
    (ii) a model definition for a form the master data will take in the central business database;
  (b) storing in the deployment database, configuration settings for deployment of the master data management application on the target computer system;
  (c) retrieving the metadata and configuration settings from the deployment database;
  (d) confirming installation instructions of the master data management application based on input into a graphical user interface;
  (e) confirming that any changes made to the metadata and configuration settings were performed using a design tool by an authorized user and that such changes were not directly performed on the target computer system; and
  (f) installing the master data management application on the target computer system based on the installation instructions, metadata, and configuration settings.

14. The article of manufacture of claim 13, wherein the business rules, process workflows, and model definition are stored as metadata in text based extensible markup language (XML) files.

15. The article of manufacture of claim 13, wherein the deployment database is a relational database.

16. The article of manufacture of claim 13, the method steps further comprising:
  storing runtime artifacts in the deployment database;
  retrieving the runtime artifacts from the deployment database; and
  basing the installation of the master data management application on the runtime artifacts;

wherein the runtime artifacts comprise a web archive file, one or more server configuration files, and one or more batch files.

17. The article of manufacture of claim 13, the method steps further comprising:
    storing a checksum in the deployment database, wherein the checksum is based on the metadata and configuration settings stored in the deployment database; and
    using the checksum on the target computer system to validate proper deployment of the master data management application.

18. The article of manufacture of claim 13, wherein the graphical user interface is used to identify file names, file locations, and configuration issues.

* * * * *